(12) United States Patent  
Elsmark et al.

(10) Patent No.: US 10,378,979 B2  
(45) Date of Patent: Aug. 13, 2019

(54) POWER TOOL

(71) Applicant: ATLAS COPCO INDUSTRIAL TECHNIQUE AB, Stockholm (SE)

(72) Inventors: Karl Johan Lars Elsmark, Saltsjö-Boo (SE); Andris Danebergs, Svärdsjö (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 393 days.

(21) Appl. No.: 15/102,651

(22) PCT Filed: Dec. 19, 2014

(86) PCT No.: PCT/EP2014/078813  
§ 371 (c)(1),  
(2) Date: Jun. 8, 2016

(87) PCT Pub. No.: WO2015/097093  
PCT Pub. Date: Jul. 2, 2015

(65) Prior Publication Data  
US 2016/0313198 A1 Oct. 27, 2016

(30) Foreign Application Priority Data  
Dec. 27, 2013 (SE) ........................................ 1351585

(51) Int. Cl.  
*B25B 21/00* (2006.01)  
*G01L 3/10* (2006.01)  
(Continued)

(52) U.S. Cl.  
CPC .............. *G01L 3/108* (2013.01); *B25B 21/00* (2013.01); *B25B 23/147* (2013.01); *G01L 5/24* (2013.01)

(58) Field of Classification Search  
CPC ........... G01L 3/108; G01L 5/24; B25B 21/00; B25B 23/147; B25B 21/02; B25B 23/0064; B25B 23/10; B23P 19/06  
See application file for complete search history.

(56) References Cited

U.S. PATENT DOCUMENTS 3,572,447 A    3/1971    Pauley et al.  
3,672,213 A *   6/1972    Watson ................... G01L 3/108  
                                                                        73/862.339

(Continued)

FOREIGN PATENT DOCUMENTS

JP        H02160479 A     6/1990  
JP        2013217684 A    10/2013

(Continued)

OTHER PUBLICATIONS

International Search Report (ISR), Written Opinion (WO) and International Preliminary Report on Patentability (IPRP) dated Apr. 10, 2015 issued in International Application No. PCT/EP2014/078813.

(Continued)

*Primary Examiner* — Robert J Scruggs  
(74) *Attorney, Agent, or Firm* — Holtz, Holtz & Volek PC

(57) ABSTRACT

A power tool including: a motor; a shaft for delivering a torque to a joint or the like, the shaft being drivingly connected to the motor; and a housing that at least partly houses the motor and the shaft. The shaft includes a longitudinal cavity in which a torque transducer is arranged to measure a torque acting over a portion of the shaft, wherein the longitudinal cavity includes: a first contact surface for torque transferring contact with a first end portion of the torque transducer; and a second contact surface, separated from the first contact surface, for torque transferring contact with a second end portion of the torque transducer, the portion over which the torque is measured being located between the first and second contact surfaces.

13 Claims, 2 Drawing Sheets

(51) Int. Cl.
*B25B 23/147* (2006.01)
*G01L 5/24* (2006.01)

(56) References Cited

U.S. PATENT DOCUMENTS

| | | | |
|---|---|---|---|
| 5,115,701 A * | 5/1992 | Lehnert | B25B 23/1425 |
| | | | 73/862.21 |
| 8,991,518 B2 | 3/2015 | Elsmark | |
| 2004/0187650 A1 | 9/2004 | Sittig et al. | |
| 2012/0085562 A1* | 4/2012 | Elsmark | B25B 21/00 |
| | | | 173/217 |
| 2013/0291695 A1* | 11/2013 | Bricker | B25B 11/00 |
| | | | 81/489 |

FOREIGN PATENT DOCUMENTS

| | | | |
|---|---|---|---|
| WO | 9739857 A1 | 10/1997 | |
| WO | 2010144048 A1 | 12/2010 | |

OTHER PUBLICATIONS

Japanese Office Action dated Sep. 5, 2018 (and English translation thereof) issued in counterpart Japanese Application No. 2016-542895.

* cited by examiner

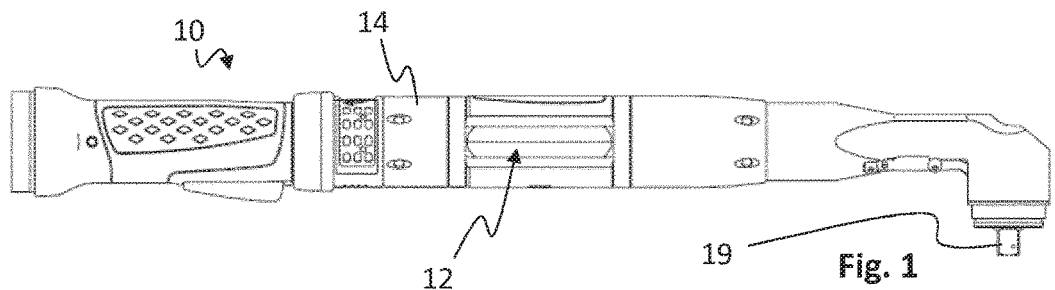
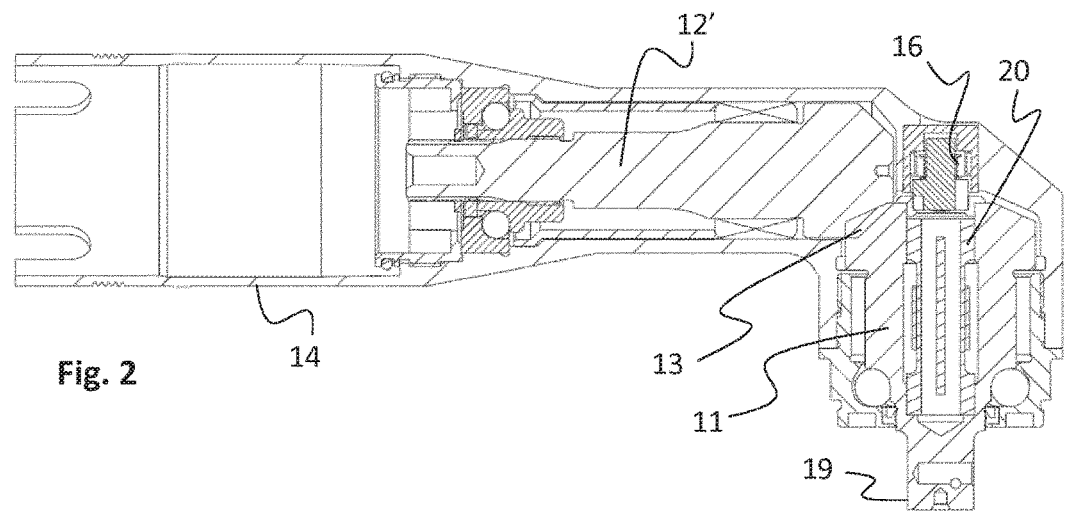
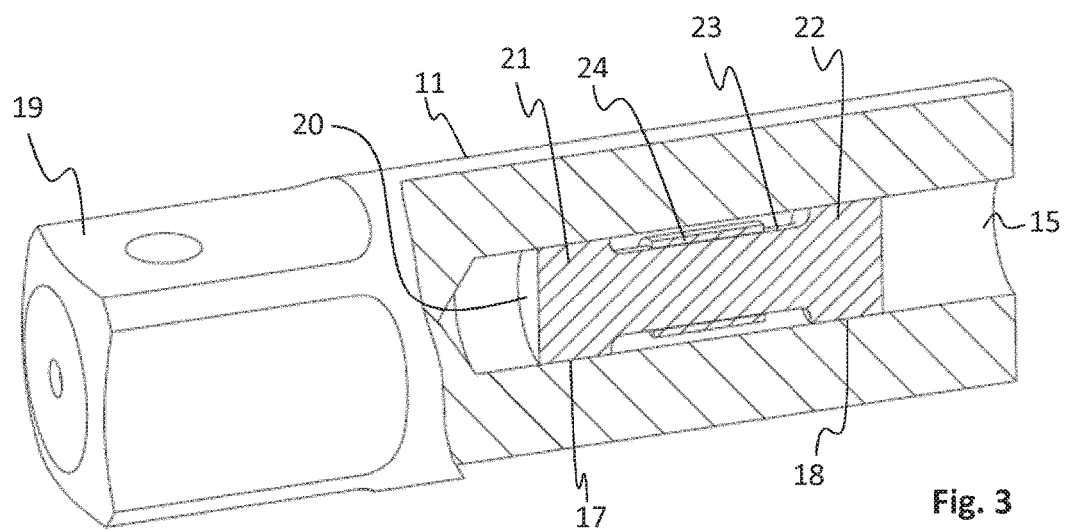

POWER TOOL

The invention relates to a torque delivering power tool adapted to include a torque transducer at a torque transmitting shaft, and to a torque transducer adapted to be located at a torque transmitting shaft of such a power tool.

BACKGROUND

In most torque delivering power tools it is desired to continuously measure the torque delivered by the tool to e.g. a joint. In general the torque may be measured anywhere along the drive line from the motor to the output shaft.

In order to minimise the errors in the torque measuring it is beneficial to locate the torque transducer as close as possible to the output shaft. In some applications the torque transducer is even located on the output shaft. In such arrangements a wireless data transmission has to be provided between the torque transmitting output shaft and a control unit housed inside the tool or at a location close to the workplace of the tool.

A problem related to this is however that the torque transducer and the wireless data transmission will need space, and the space is very limited inside a power tool, especially around the output shaft.

In WO 2010/144048 A1 a power wrench is disclosed in which a circuit board is arranged in a cavity inside a shaft of the transmission between the motor and the output shaft. This arrangement reduces the space demands inside the tool housing. The torque transducer, which is comprised of a strain gauge, does however require a certain length of the shaft. Hence, it is still a desirable to improve the compactness of the power tool.

There is a need for a solution that provides a liable measurement of the torque, e.g. close to the output shaft, but which does not demand a lot of space inside the housing of the tool.

SUMMARY OF THE INVENTION

An object of the invention is to provide an arrangement of measuring the torque delivered by a power tool close to the output shaft in a way that does not require a lot of space inside the housing of the power tool.

This object is achieved by the invention according to the independent claims. According to first aspect the invention relates to a power tool including a motor, a shaft for delivering a torque to a joint or the like, the shaft being drivingly connected to said motor, and a housing that at least partly houses the motor and the shaft. The shaft comprises a longitudinal cavity, which is adapted to receive a torque transducer to measure the torque acting over a portion of said shaft.

By providing a cavity inside which a torque transducer may be arranged a substantial space saving is achieved inside the power tool housing. The space saving may be achieved in that bearings may be located at the outside of the same shaft part where the torque transducer is arranged. Further, at the same time, an advantageous way of monitoring the torque close to or at the output shaft is achieved.

In one embodiment the shaft is an integrated part of art output shaft and includes an output end that is to be connected to a fastener for delivering a torque to said fastener.

In another embodiment the longitudinal cavity comprises a first contact surface for torque transferring contact with a first end portion of the torque transducer and, separated from the first contact surface, a second contact surface for torque transferring contact with a second end portion of the torque transducer, the portion over which the torque is measured being located between said contact surfaces.

The relative resilience of the portion of the shaft over which the torque is measured and a resilient portion of the torque transducer needs to be known in order to determine how much of the torque will pass over the transducer. This is usually calculated for every type of shaft-transducer combination and it may also be empirically tested for each particular type of combination.

In yet another embodiment the longitudinal cavity comprises splines for torque transferring contact with the torque transducer.

In another embodiment the power toot further comprises a torque transducer which is arranged in torque transferring contact with the contact surfaces inside the interior of the longitudinal cavity of the shaft. The torque transducer may e.g. be fixedly arranged to the contact surfaces by means of an adhesive.

In one embodiment the shaft is connected to the motor via a bevel gear. In another embodiment the shaft is connected to the motor via a planetary gear. The shaft with the torque transducer may also be directly connected to the motor.

According to a second aspect the invention relates to a torque transducer for arrangement inside a hollow shaft of a power tool, which torque transducer comprises two end portions which are arranged to be in torque transferring contact with contact surfaces in the interior of a longitudinal cavity of the shaft and wherein a torsionally resilient portion is provided between said two end portions over which resilient portion the torque is measured by means of at least one torque measuring element.

The torque transducer is thus adapted to measure the torque over a certain portion of the shaft in which it is arranged.

In one embodiment the torsionally resilient portion includes a waist along which the at least one torque measuring element is arranged.

In another embodiment the end portions comprise splines for torque transferring contact with separated splined portions in the interior of said longitudinal cavity of the shaft.

Other features and advantages of the invention will be apparent from the figures and from the detailed description of the shown embodiment.

SHORT DESCRIPTION OF THE DRAWINGS

In the following detailed description reference is made to the accompanying drawings, of which:

FIG. 1 shows a power tool according to an aspect of the invention;

FIG. 2 is a sectional view of head portion of power tool with a torque transducer arranged inside the output shaft;

FIG. 3 shows a partly cross-sectional view of a shaft with a torque transducer arranged inside it;

DETAILED DESCRIPTION OF THE SHOWN EMBODIMENT OF THE INVENTION

Figure 4:
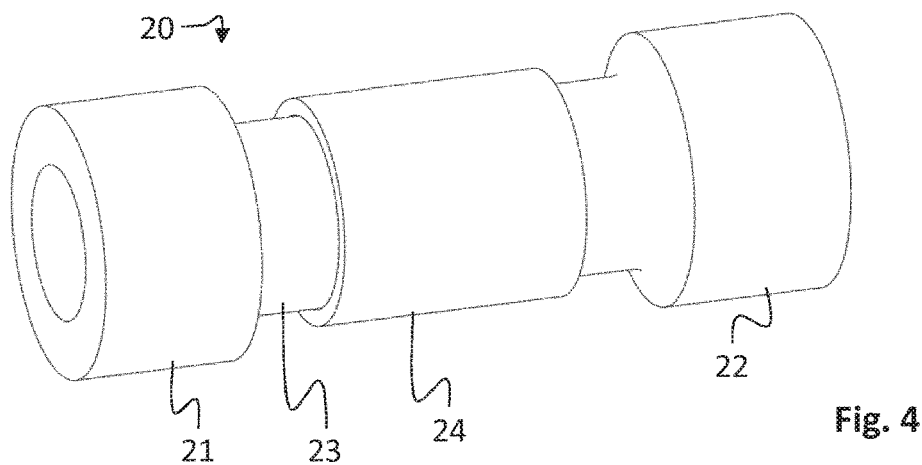
FIG. 4 shows a torque transducer according to a specific embodiment of the invention.

In FIG. 1 a power tool 10 is shown. The power tool has a housing 14 that inter alia houses a motor 12.

In FIG. 2 a head portion of the power tool 10 is shown. A motor shaft 12', which is driven by the motor (not included in the figure), is connected via a bevel gear 13 to a shaft 11. The shaft 11 is drivingly connected to the motor 12 via the gear 13. The housing 14 is arranged to house the motor shaft 12', the gear 13 and part of the shaft 11. In the embodiment in FIGS. 1 and 2 the power tool includes a bevel gear 13. However the invention is not restricted to such a tool but may just as well be implemented in a straight tool, e.g. of the pistol type. The shaft 11 may be connected to the motor via a planetary gear. The shaft may also be directly connected to the motor.

As is shown in FIG. 3, the shaft 11 comprises a longitudinal cavity 15, which is adapted to receive a torque transducer 20 to measure the torque acting over said shaft 11. In the shown embodiment the shaft is an integrated part of an output shaft and includes an output end 19 onto which a socket for interaction with a fastener is to be attached. This may be an advantage as it means that the torque transducer 20 will be located as close to the actual joint as possible, such that the measured torque will correspond as close as possible to the torque delivered to the joint.

A signal transmitter pair 16 is arranged to transfer signals from the shaft 11 to a control unit (not shown). The control unit may be located inside the tool housing 14 or may be located in a separate control station distant from the power tool. Signal transmitting in itself is well known to the skilled person and will not be described in detail in this application. Reference is made to WO 2010/144048 A1 which describes a manner of performing the handling of signals inside the tool. Further, it is to be noted that the torque transducer may advantageously be arranged next to a circuit board inside the same cavity 15 of the shaft 11. In the embodiment of the torque transducer shown in FIG. 5 the circuit board 25 is arranged inside the torque transducer.

By arranging the torque transducer 20 as close as possible to the output end of the power tool 10, the measured torque will reflect the torque transmitted to the joint in the truest way. If the torque transducer 20 were arranged closer to the motor 12, with a gear located between the torque transducer 20 and the output shaft, the gear would provide a fault to the measurements.

The shaft 11 has a longitudinal cavity 15 which comprise two separated contact surfaces 17,18 for intimate contact with the torque transducer 20 such that the torque transducer 20 may be releasably arranged inside the longitudinal cavity 15 of the shaft 11. The contact surfaces 17,18 should be separated from each other by a at least a short distance such that part of the torque may travel via the torque transducer over this distance. The contact surfaces 17,18 may include splines to interact with corresponding splines on the torque transducer 20. In fact the torque transducer 20 may be arranged as a module that may be arranged in shafts of varying size. The relative thickness of the shaft wall and the torque transducer waist will govern how much of the torque that will travel through the shaft and how much will go through the torque transducer.

Hence, almost regardless of the size of the power tool a module of a standard size may be used. In some cases, where the shaft is relatively big, only about one percent of the total torque or less of the torque will be passing through the torque transducer 20. In other cases, where the shaft is relatively small, up to 50 percent of the total torque may pass through the torque transducer 20. In the embodiment shown in FIG. 2 the transducer 20 is comprised of a solid piece. It may however preferably be hollow with a thickness adapted to the torque it is to measure, as shown in FIGS. 4-6.

As indicated in FIG. 3 the longitudinal cavity 15 comprises a first contact surface 17 for intimate contact with a first end portion 21 of the torque transducer 20 and, separated from the first contact surface 17, a second contact surface 18 for intimate contact with a second end portion 22 of the torque transducer 20. Also, in order to improve the contact between the torque transducer 20 and the contact surfaces 17,18 the torque transducer 20 may be fixedly arranged at the contact surfaces 17,18 by means of an adhesive. Another possible way of fitting the torque transducer 20 inside the longitudinal cavity 15 of the shaft is to shrink fit the torque transducer 20 into the shaft 11, e.g. by warming the shaft 11 in order to make it expand just enough to allow the torque transducer 20 to be inserted into it.

In a further embodiment only the outer second end portion 22 is shrink fitted to the second contact surface 18, whereas the first end portion 21 may be attached to the first contact surface 17 via both splines and an adhesive. Preferably a heat cured adhesive.

Figure 5:
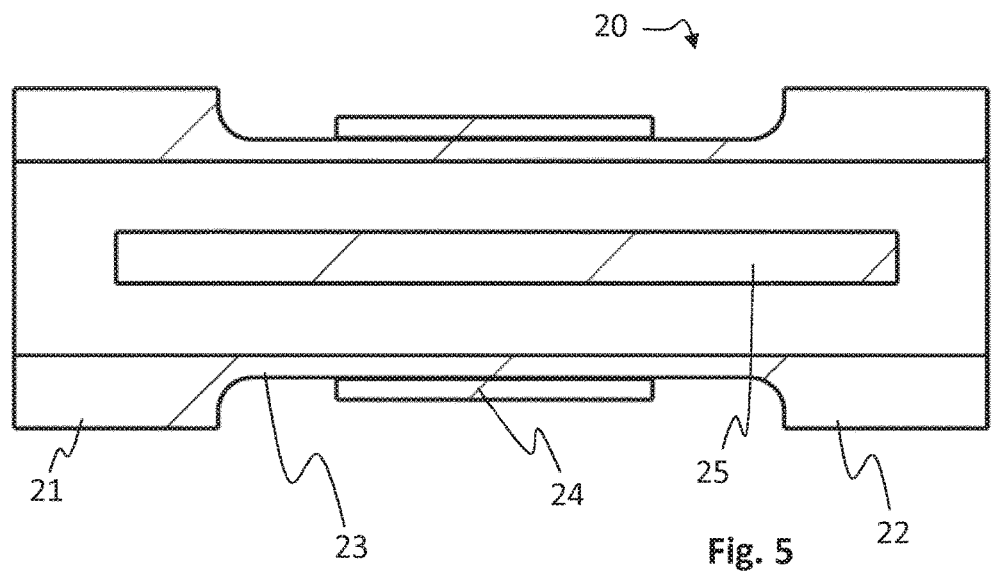
FIG. 5 shows a cross-sectional view of the torque transducer shown in FIG. 4.
Figure 6:
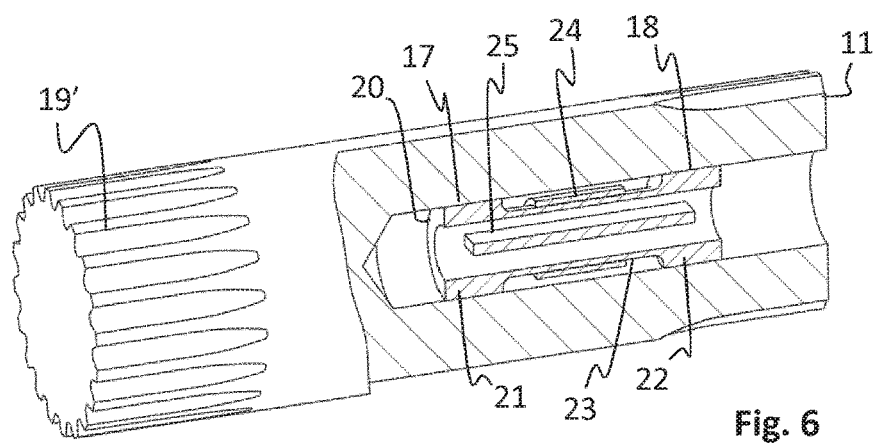
FIG. 6 shows a cross-sectional view of a shaft inside which a torque transducer is be located.

The torque transducer 20 is shown in detail in FIGS. 4 and 5. As mentioned above the torque transducer comprises two end portions 21,22 which are arranged to be in close contact with the interior of a longitudinal cavity 15 of a shaft 11. A resilient portion 23 is provided between said two end portions 21,22 over which resilient portion 23 the torque is measured. In the shown embodiment the resilient portion is comprised of a waist. In the middle of said waist a torque measuring element 24 such as a strain gauge is located. In a specific embodiment a plurality of torque measuring element 24 are located along the periphery of the torque transducer 11.

The redundancy of torque measuring elements 24 may be useful since it minimises the impact of one faulty measurement. Further, if the shaft is exploited to strain this strain may influence the torque measurements in a negative way. By arranging a torque measuring element 24 on opposite sides of the shaft 11 the mean value of the measurements may still be relatively correct, since they will compensate each other. The provision of measuring elements on a peripheral surface is however well known to a person skilled in the art and does not need to be more closely described in this application In FIG. 6 an alternative shaft 11 is shown in a longitudinal sectional view. Instead of quadratic output end (19) the shaft 11 has a tubular, preferably splined or geared, connection end 19'. Hence this shaft is not to be arranged as an output shaft. Instead it is to be used inside the tool for providing a torque from one point, e.g. a motor, to another point, e.g. a bevel gear.

In the shown embodiment the shaft is tubular in shape over its full length. The shape is however not decisive. Shafts of other shapes may also be used along with the inventive torque transducer. From FIG. 6 it may be observed that the shaft 11 of the shown embodiment has an inner diameter and an outer diameter. The end portions 21,22 of the torque transducer 20 has an outer diameter that corresponds very closely to the inner diameter of the hollow portion 19 of the shaft 11. It is of course important that the torque transducer 20 is very tightly fitted inside the shaft 11, such that the efforts are correctly transferred without delay from the shaft 11 to the torque transducer 20. Hence, there should be no or very little possibility for the torque transducer 20 to rotate with respect to the shaft 11.

Above, the invention has been described with reference to specific embodiments. The invention is however not limited so these embodiments. It is obvious to a person skilled in the art that the invention comprises further embodiments within its scope of protection, which is defined by the following claims.

The invention claimed is:

1. A power tool comprising:
   a motor;
   a gear;
   a shaft for delivering a torque, the shaft being drivingly connected to the motor via the gear; and
   a housing that at least partly houses the motor, the gear, and the shaft,
   wherein the shaft comprises a longitudinal cavity in which a torque transducer is arranged to measure a torque acting over a portion of the shaft,
   wherein the longitudinal cavity comprises:
      a first contact surface for torque transferring contact with a first end portion of the torque transducer; and
      a second contact surface, separated from the first contact surface, for torque transferring contact with a second end portion of the torque transducer,
   wherein the portion over which the torque is measured is located between the first and second contact surfaces, and
   wherein the torque transducer is arranged inside an interior of the longitudinal cavity of the shaft, and comprises:
      at least one torque measuring element;
      the first end portion, which is in torque transferring contact with the first contact surface in the interior of the longitudinal cavity of the shaft;
      the second end portion, which is in torque transferring contact with the second contact surface in the interior of the longitudinal cavity of the shaft;
      a torsionally resilient portion provided between the first and second end portions and over which the torque is measured by the at least one torque measuring element; and
      a circuit board arranged inside a hollow portion of the torque transducer.

2. The power tool according to claim 1, wherein the shaft is an integrated part of an output shaft and includes an output end that is configured to be connected to a fastener for delivering a torque to said fastener.

3. The power tool according to claim 2, wherein the longitudinal cavity further comprises splines configured to make torque transferring contact with the torque transducer.

4. The power tool according to claim 3, wherein the torque transducer is fixedly coupled to the first and second contact surfaces by an adhesive.

5. The power tool according to claim 2, wherein the torque transducer is fixedly coupled to the first and second contact surfaces by an adhesive.

6. The power tool according to claim 1, wherein the longitudinal cavity further comprises splines configured to make torque transferring contact with the torque transducer.

7. The power tool according to claim 6, wherein the torque transducer is fixedly coupled to the first and second contact surfaces by an adhesive.

8. The power tool according to claim 1, wherein the torque transducer is fixedly coupled to the first and second contact surfaces by an adhesive.

9. The power tool according to claim 1, wherein the torsionally resilient portion comprises a waist along which the at least one torque measuring element is arranged.

10. The torque transducer according to claim 9, wherein:
    the first and second end portions comprise splines;
    the first and second contact surfaces in the interior of the longitudinal cavity of the shaft, which are separated from each other, comprise splines; and
    the splines of the first and second end portions make torque transferring contact with the splines of the first and second contact surfaces.

11. The power tool according to claim 9, wherein the waist of the torque transducer is narrower than both the first and second end portions that make torque transferring contact with the first and second end surfaces.

12. The torque transducer according to claim 1, wherein:
    the first and second end portions comprise splines;
    the first and second contact surfaces in the interior of the longitudinal cavity of the shaft, which are separated from each other, comprise splines; and
    the splines of the first and second end portions make torque transferring contact with the splines of the first and second contact surfaces.

13. The power tool according to claim 1, wherein the gear is a bevel gear.

* * * * *